United States Patent
Koyama et al.

(10) Patent No.: US 6,495,253 B1
(45) Date of Patent: Dec. 17, 2002

(54) SUPPORT FILM FOR A TRANSPARENT CONDUCTIVE THIN FILM

(75) Inventors: Masuo Koyama, Ageo (JP); Yoshihisa Kimura, Urawa (JP); Atsunobu Hirosawa, Yono (JP)

(73) Assignee: Kimoto Co., Ltd. (JP)

( * ) Notice: Subject to any disclaimer, the term of this patent is extended or adjusted under 35 U.S.C. 154(b) by 59 days.

(21) Appl. No.: 09/662,344

(22) Filed: Sep. 14, 2000

(30) Foreign Application Priority Data

Sep. 17, 1999 (JP) .......................................... 11-263490
Sep. 17, 1999 (JP) .......................................... 11-263492

(51) Int. Cl.[7] .............................. B32B 7/12; B32B 15/04
(52) U.S. Cl. .................. 428/343; 428/345; 428/355 R; 428/354; 428/352
(58) Field of Search .................. 428/343, 345, 428/355 R, 354, 352

(56) References Cited

U.S. PATENT DOCUMENTS

| | | | |
|---|---|---|---|
| 4,181,752 A | 9/1978 | Martens et al. ............. | 427/54.1 |
| 4,180,619 A | 12/1979 | Makhlouf et al. .......... | 526/202 |
| 4,556,595 A | 12/1985 | Ochi ........................... | 428/143 |
| 4,748,061 A | 5/1988 | Vesley .......................... | 428/40 |
| H509 H | 8/1988 | Chao .......................... | 526/264 |
| 4,855,170 A | 8/1989 | Darvell et al. ................ | 428/40 |
| 5,753,362 A | 5/1998 | Kawase et al. ............. | 428/327 |

Primary Examiner—Daniel Zirker
Assistant Examiner—Victor Chang
(74) Attorney, Agent, or Firm—Lorusso & Loud

(57) ABSTRACT

An adhesive layer composed of at least an ionizing radiation curable resin binder, a thermoplastic resin binder and two or more matting agents having different average diameters is formed on a transparent polymer film to obtain a support film for a transparent conductive thin film. Alternatively, a transparent hard coat layer containing at least an ionizing radiation curable resin binder and, a matting agent having an average diameter of 1–15 μm, and an adhesive layer containing at least an ionizing radiation curable resin binder, a thermoplastic resin binder and a matting agent having an average diameter of 5–50 nm are formed on a transparent polymer film. The thus obtained support film is excellent in durability when the transparent conductive thin film is formed thereon and prevents occurrence of a Newton-ring, which is produced in a touch panel of the conventional liquid crystal display. The support film, when used in a touch panel of a color liquid crystal display, prevents glare of the color screen and is suitable for use in touch panels of both monochrome and color liquid crystal displays.

8 Claims, 1 Drawing Sheet

SUPPORT FILM FOR A TRANSPARENT CONDUCTIVE THIN FILM

TECHNICAL FIELD

The present invention relates to a base film for a transparent conductive thin film suitable for use in a transparent touch panel or the like. In particular, it relates to an easy adhesion film which, when formed thereon with a transparent conductive thin film such as an indium-tin oxide film to obtain a transparent conductive film sheet, improves the durability of the transparent conductive thin film, particularly the adhesiveness of the transparent conductive thin film thereof. Still more particularly, it relates to such an easy adhesion film suitable for use in a touch panel of a color liquid crystal display.

BACKGROUND OF INVENTION

The liquid crystal display has recently drawn attention as an image display device and is expected to be used increasingly in portable electronic notebooks, information terminals and the like. As an input device for portable electronic notebooks and information terminals, a transparent touch panel overlaid on the liquid crystal display device is commonly used. The resistance film type touch panel is a frequent choice for its low cost.

The generally used resistance film type touch panel has a structure in which a transparent conductive film sheet and a glass provided with a transparent conductive thin film are disposed across a proper gap. As the transparent conductive film sheet, a transparent polymer film provided with a transparent conductive thin film such as indium-tin oxide (ITO) is generally used.

As the transparent polymer film of the transparent conductive film sheet, there is used a film having a surface in which many fine protrusions and recesses with specific ranges of a maximum height and an arithmetical mean deviation are formed by embossing in order to prevent the Newton ring which occurs when the touch panel is touched (pressed) (Japanese Patent Application Un-examined Publication No.H8-77871 ('96).

In the transparent conductive film sheet using the above-mentioned transparent polymer film, however, adhesion of the transparent polymer film to the transparent conductive thin film is insufficient. A problem of poor durability therefore arises when the transparent conductive film sheet is used in a touch panel. Specifically, the transparent conductive thin film is likely to peel off or be abraded. Up to now, a film having high durability when provided with a transparent conductive thin film and also having anti-Newton ring property has not been available.

On the other hand, owing to advances in the color performance of CRTs and flat panel displays using touch panel displays and also higher color definition in various displays, a problem has arisen that, when a conventional transparent conductive film sheet subjected to a surface roughening treatment for preventing occurrence of the Newton ring is used in a touch panel, the high-definition color screen, particularly the white portions thereof, produce glare.

Accordingly, an object of the present invention is to provide an easy adhesion film for a transparent conductive thin film, that is excellent in durability when the transparent conductive thin film is provided thereon and capable of preventing occurrence of the Newton ring when it is used in a transparent conductive film sheet of a touch panel of a conventional liquid crystal display. Another object of the present invention is to provide an easy adhesion film for a conductive thin film, that is capable of preventing glare of a color screen when it is used in a touch panel of a color liquid crystal display and is suitable for use in touch panels of both monochrome and color liquid crystal displays.

SUMMARY OF THE INVENTION

To attain the above objects, the inventors conducted extensive studies on the relationship between the rough surface of a transparent conductive film sheet used in a touch panel of a color liquid crystal display, namely, the surface thereof formed with a transparent conductive thin film, and the glare of the color screen. As a result, it was found that, since protrusions and recesses of the conventional base film are regular and smooth, the surface functions as lenses, enlarges and emphasizes the RGB light-emitting points, which are the source of the color display, and consequently the color screen produces glare. They accomplished the present invention based on this knowledge.

Specifically, the easy adhesion film for a transparent conductive thin film of the present invention is obtained by imparting an easy adhesion property to a transparent polymer film used as a base film on which the transparent conductive thin film is to be formed. The easy adhesion film is also made capable of preventing occurrence of the Newton ring without producing a lens effect by using two kinds of matting agents having different particle diameters to control the shape of the surface.

An easy adhesion film for a transparent conductive thin film according to a first aspect of the present invention comprises a transparent polymer film and an easy adhesion layer formed on the transparent polymer film, which easy adhesion layer is composed of at least an ionizing radiation curable resin, a thermoplastic resin binder and two or more kinds of matting agents having different average diameters.

In the easy adhesion film for a transparent conductive thin film according to the first aspect, the matting agents preferably consist of at least two kinds of matting agents having an average diameter of 1–15 $\mu$m and an average diameter of 5–50 nm.

An easy adhesion film for a transparent conductive thin film according to the second aspect of the present invention comprises a transparent polymer film, a transparent hard coat layer containing at least an ionizing radiation curable resin and a matting agent having an average diameter of 1–15 $\mu$m formed on the transparent polymer film, and an easy adhesion layer for a transparent conductive thin film containing at least an ionizing radiation curable resin, a thermoplastic resin binder and a matting agent having an average diameter of 5–50 $\mu$m formed on the transparent hard coat layer.

In the easy adhesion film for a transparent conductive thin film of the second aspect, the thickness of the transparent hard coat layer is preferably 2–15 $\mu$m and the thickness of the easy adhesion layer for a transparent conductive thin film is preferably 0.2–1.5 $\mu$m.

The present invention also provides a transparent conductive film sheet comprising a base film and a transparent conductive thin film formed on the base film, wherein the base film is one the above-mentioned easy adhesion films according to the present invention.

By use of the easy adhesion film for a transparent conductive thin film of this invention, there can be provided a transparent conductive film sheet excellent in durability when a transparent conductive thin film is formed, by providing an easy adhesion layer comprising at least an ionizing radiation curable resin binder, a thermoplastic resin binder and matting agents, and, as the matting agents of the easy adhesion layer or using a matting, using two kinds of matting agents having different average diameters or using a matting agent having a relatively small diameter and providing a hard coat layer containing a matting agent having a relatively large diameter between the transparent polymer film and the easy adhesion layer. This transparent conductive film sheet can prevent occurrence of the Newton ring when it is used in a touch panel of the conventional liquid crystal display and also prevent glare of a color screen when it is used in a touch panel of a color liquid crystal display. Accordingly, the present invention can provide a transparent conductive film sheet suitable for use in both touch panels of monochrome and color liquid crystal displays.

BEST MODE FOR CARRYING OUT THE INVENTION

An easy adhesion film for a transparent conductive thin film of the present invention will be described with reference to the attached figures in further detail.

Figure 1A:
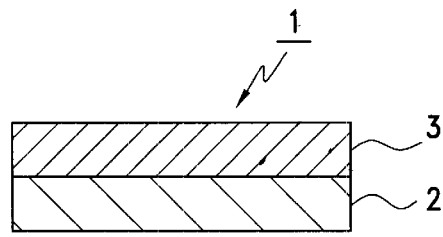
FIG. 1(a) and (b) are cross-sectional views showing an embodiment of an easy adhesion film for a transparent conductive thin film according to the first aspect of the present invention and an embodiment of an easy adhesion film for a transparent conductive thin film according to the second aspect of the present invention, respectively.
Figure 2:
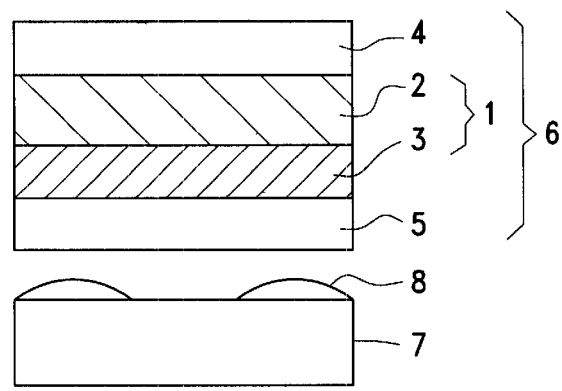
FIG. 2 shows an embodiment of a touch panel employing an easy adhesion film for a transparent conductive thin film according to the first aspect of the present invention.

FIG. 1(a) shows an easy adhesion film 1 for a transparent conductive thin film according to the first aspect of the present invention, and FIG. 2 shows an embodiment of a touch panel incorporated with a transparent conductive film sheet produced using the adhesion film for a transparent conductive thin film 1. The transparent conductive film sheet 6 shown in FIG. 2 is produced by forming a hard coat film 4 on the surface of the easy adhesion film for a transparent conductive thin film 1 opposite to the surface provided with the easy adhesion layer 3, and forming a transparent conductive thin film 5 such as an ITO film or the like on the easy adhesion layer 3.

The easy adhesion film for a transparent conductive thin film 1 is produced by forming the easy adhesion layer 3 on a transparent polymer film 2. The easy adhesion layer 3 is composed of at least an ionizing radiation curable resin binder, a thermoplastic resin binder and two or more kinds of matting agents having different average diameters.

As a transparent polymer film 2, one which does not inhibits transparency, such as polyethylene terephthalate, polybutylene terephthalate, polycarbonate, polypropylene, polyethylene, acrylic resins, acetyl cellulose and vinyl chloride, can be used. A stretched film, particularly biaxially stretched film, is preferable for its improved mechanical strength and dimensional stability. The thickness can be appropriately selected depending on the material to be used, but, in general, is 20–500 µm, preferably 50–200 µm.

The easy adhesion layer 3 formed on the transparent polymer film 2 is excellent in anti-abrasion property and adhesion property to the transparent conductive thin film 5 such as an ITO. These properties improve durability of the transparent conductive thin film 5 and prevent occurrence of the Newton ring when the transparent conductive film sheet 6 provided with the transparent conductive thin film 5 is used in a touch panel or the like.

Even though the transparent conductive film sheet is used in a touch panel of a color liquid crystal display, it can prevent glare of the color screen. Accordingly, the transparent conductive film sheet 6 is suitable for use in not only a touch panel of a monochrome liquid crystal display but also a touch panel of a color liquid crystal display.

The easy adhesion layer can be formed by applying a composition including, as main ingredients, an ionizing radiation curable resin binder and a thermoplastic resin binder, and two kinds of matting agents having different average diameters, and then exposing to ionizing radiation (UV or electron beam) to cross-link and cure the coating.

The ionizing radiation curable resin may be composed of a paint, which can be cross-linked and cured by exposure to ionizing radiation (UV or electron beam). As the ionizing radiation curable paint, one or more kinds of a photopolymerizable prepolymer or photopolymerizable monomer can be used.

As the photopolymerizable prepolymer, an acrylic prepolymer, which has two or more acryloyl groups per molecule and becomes a three-dimensional network structure after cross-linking and curing is particularly preferable. Usable acrylic prepolymers include urethane acrylate, polyester acrylate, epoxy acrylate, melamine acrylate and the like.

Usable photopolymerizable monomer include multi functional monomers such as trimethylolpropane triacrylate, pentaerythritol triacrylate, dipentaerythritol hexaacrylate, dipentaerythritol monohydroxy pentaacrylate, neopentylglycol diacrylate, tripropyleneglycol triacrylate, diethyleneglycol diacrylate and 1,6-hexanediol diacrylate.

The ionizing radiation curable resin binder imparts anti-abrasion property to the easy adhesion layer 3 and, when combined with the matting agents, also imparts anti-Newton ring property without impairing light-transmitting property of the film as described later.

An amount of the ionizing radiation curable resin binder is preferably 70–97 weight % of a total amount of binders constituting the easy adhesion layer 3. When the amount is not more than 97 weight %, adhesion between the easy adhesion layer 3 and the transparent conductive thin film 5 is not impaired. When the amount is not less than 70 weight %, durability of the easy adhesion layer 3 becomes good and, when admixed with the matting agents, anti-Newton ring property as well as an excellent light-transmitting property can be achieved.

Usable thermoplastic resin binders include cellulose derivatives such as acetylcellulose, nitrocellulose, acetylbutylcellulose, ethylcellulose and methylcellulose, vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resins and copolymers thereof andmethacrylic resins and copolymers thereof, polystyrene resins, polyamide resins, linear polyester resins, polycarbonate resins and the like.

The thermoplastic resin binder improves adhesion of the easy adhesion layer 3 to the transparent conductive thin film 5. An acetal resin binder is particularly preferred.

An amount of the thermoplastic resin binder is 3–30 weight % of total amounts of binder ingredients constituting the easy adhesion layer 3. When the amount is not less than 3 weight %, adhesion between the easy adhesion layer 3 and the transparent conductive thin film 5 becomes good. When the amount is not more than 30 weight %, anti-abrasion property of the easy adhesion layer 3 is not impaired.

Other resins such as thermosetting resins may be added to the easy adhesion layer 3 so long as its adhesion property to the transparent conductive layer 5, anti-abrasion property, light-transmitting property and the like are not impaired.

Usable thermosetting resin include thermosetting urethane resins composed of acrylic polyol and isocyanate prepolymer, phenol resins, urea-melamine resins, epoxy resins, unsaturated polyester resins, silicon resins and the like.

Usable matting agents contained in the easy adhesion layer 3 include one or more kinds inorganic or organic micro-particles such as silica, alumina, titanium dioxide, calcium carbonate, bariumsulfate, zirconiumoxide, talc, clay, aluminiumstearate, calcium stearate, zinc stearate, styrene resin, acrylic resin, silicone resin and the like. Two or more kinds of different average diameters are used in mixture.

According to a preferable embodiment, the two or more kinds of the matting agent having different average diameters are at least one kind of relatively large matting agent having an average diameter of 1–15 µm and relatively small matting agent having an average diameter of 5–50 nm. The mixing ratio of the larger matting agent having an average diameter of 1–15 µm is 1–8 weight parts, preferably 2–6 weight parts based on 100 weight parts of the resin binder. The ratio of the smaller matting agent having an average diameter of 5–50 nm is 1–8 weight parts, preferably 2–6 weight parts based on 100 weight parts of the ionizing radiation curable resin.

The surface of an ionizing radiation curable resin coating containing particulate substances comes to have unique wave-like protrusions and recesses. The easy adhesion layer 3 of the present invention, in which the matting agents and the aforementioned ionizing radiation curable resin binder are used in combination, utilizes this wave-like protrusions and recesses and exhibits an excellent anti-Newton ring property as well as high transparency due to the small content of the matting agents, i.e., particulate substances. In particular, by using the two kinds of matting agents having different diameters in combination, when the transparent conductive film sheet 6 provided with the transparent conductive thin film 5 is used in a touch panel of a color liquid display, it can prevent glare of the color screen and therefore be suitable for use in not only a touch panel of a monochrome liquid crystal display but a touch panel of a color liquid crystal display.

The easy adhesion layer 3 may include a photopolymerization initiator, UV intensifier, leveling agent, solvent and the like so long as they does not impair adhesion property of the easy adhesion layer 3 to the transparent conductive thin film 5, anti-abrasion property, anti-Newton ring property with transparency and the like.

Usable photopolymerization initiators include acetophenone, benzophenone Michler's ketone, benzoin, benzilmethylketal, benzoil benzoate, α-acyloxymester, thioxanthens and the like. As the UV intensifier, n-butylamine, triethylamine, tri-n-butylphosphine and the like can be exemplified. These additives are suitably admixed with the composition containing the ionizing radiation curable resin and thermoplastic resin as binder ingredients and the two kinds of matting agents of different average diameters.

The thickness of the easy adhesion layer 3 is not limited so long as it is within the range enabling the aforementioned properties to be obtained, but can be appropriately adjusted within a range of 2–15 µm, preferably 3–8 µm.

UV having an energy of 50–300 kcal/mol and a wavelength in the range of 100–400 nm, preferably 200–400 nm is used for cross-linking and curing the easy adhesion layer 3. Such UV can be applied by using an ultra-high-pressure mercury-vapor lamp, high-pressure mercury-vapor lamp, low-pressure mercury-vapor lamp, carbon arc, metal halide lamp or the like.

Otherwise, an electron beam having an acceleration voltage of 1000 keV or less, preferably an energy of 100–300 keV and a wavelength in the range of 100 nm or less can be used. Such electron beam can be applied by using a scan-type or curtain-type electron beam accelerator.

In case of curing by application of ionizing radiation, the presence of oxygen and the coating thickness are closely related. Since radicals generated by applying ionizing radiation capture oxygen, curing is inhibited. Therefore, if the coating is thin, the ratio of surface area to coating volume becomes large and curing is easily inhibited by oxygen in the air. In order to prevent this curing inhibition, it is preferable to perform irradiation under an inert gas such as $N_2$ gas.

An easy adhesion film for a transparent conductive thin film according to the second aspect of the present invention will be described with reference to the attached figures in further detail.

Figure 1B:
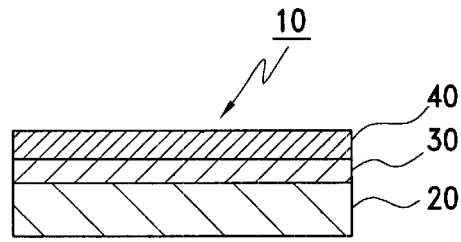
Figure 3:
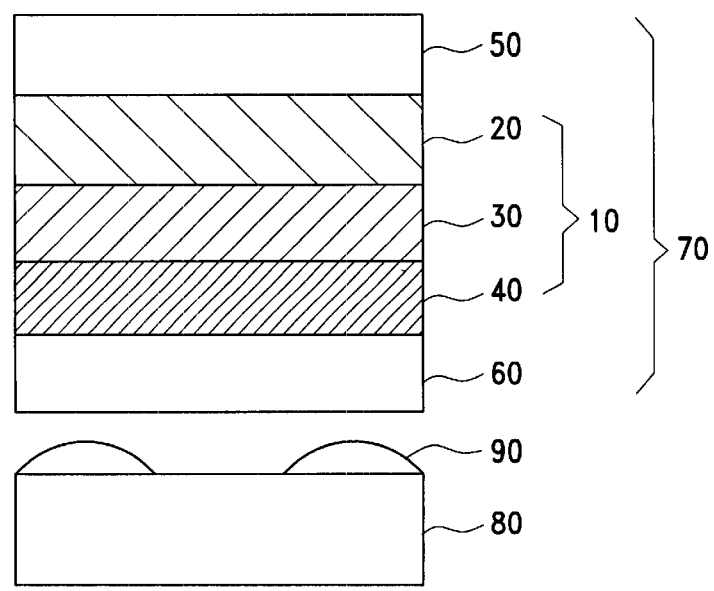
FIG. 3 shows an embodiment of a touch panel employing an easy adhesion film for a transparent conductive thin film according to the second aspect of the present invention

FIG. 1(b) shows the easy adhesion film for a transparent conductive thin film 10 according to the second aspect of the present invention, and FIG. 3 shows an embodiment of a touch panel incorporated with a transparent conductive film sheet obtained using the adhesion film for a transparent conductive thin film 10. The transparent conductive film sheet 70 shown in FIG. 3 is produced by forming a hard coat film 50 on the surface of the easy adhesion film for a transparent conductive thin film 10 opposite to an easy adhesion layer for a transparent conductive thin film (hereinafter referred to as easy adhesion layer) 40, and forming a transparent conductive thin film 60 such as an ITO film or the like on the easy adhesion layer 40.

The easy adhesion film for a transparent conductive thin film 10 consists of a transparent hard coat layer 30 including at least an ionizing radiation curable resin binder and a matting agent having an average diameter of 1–15 µm, and the easy adhesion layer 40 including at least an ionizing radiation curable resin binder, a thermoplastic resin binder and a matting agent having an average diameter of 5–50 nm.

The same transparent polymer film 20 as the transparent polymer film 2 employed in the easy adhesion film for a transparent conductive thin film 1 according to the first aspect can be employed.

The transparent hard coat layer 30 formed on the transparent polymer film 20 is excellent in anti-abrasion property and adhesiveness to the easy adhesion layer 40. These properties reinforces anti-abrasion property of the easy adhesion layer 40 and improves durability of the transparent conductive thin film 60 formed on the easy adhesion layer 40.

Further, the transparent hard coat layer 30 prevents occurrence of the Newton ring when the transparent conductive film sheet 70 obtained by forming a transparent conductive thin film 60 on the easy adhesion layer 40 is used in a touch panel and the like.

The transparent hard coat layer 30 can be obtained by applying a composition including the ionizing radiation curable resin as a main binder ingredient and a matting agent having an average diameter of 1–15 μm (hereinafter referred to as "large-diameter matting agent"), and exposing to ionizing radiation (UV or electron beam) to cross-link and cure the coating.

The ionizing radiation curable resin binder imparts anti-abrasion property to the transparent hard coat layer 30, and, when combined with a matting agent, also imparts the anti-Newton ring property without degrading transparency as described later. The same ionizing radiation curable resin binder as those usable in the easy adhesion layer 3 according to the first aspect can be used.

The resin binder for forming the transparent hard coat layer 30 can be an ionizing radiation curable resin binder mixed with other resin binders so as to improve adhesion of the transparent hard coat layer 30 to the easy adhesion layer 40 so long as the aforementioned effects can be achieved. Usable resin binders include thermoplastic resin binders, thermosetting resin binders and the like, which are the same as those usable in the easy adhesion layer 3 according to the first aspect.

The large-diameter matting agent primarily plays a role of imparting anti-Newton ring property to the easy adhesion film for a transparent conductive thin film 1. The average diameter is preferably 1–15 μm, more preferably 2–10 μm. Usable matting agents include inorganic or organic micro-particles such as silica, alumina, titanium dioxide, talc, calcium carbonate, barium sulfate, zirconium oxide, clay, aluminium stearate, calcium stearate, zinc stearate, styrene resin, acrylic resin, silicone resin. One or more kinds of the micro-particles can be used in mixture.

The mixing ratio of the large-diameter matting agent is 1–8 weight parts, preferably 2–6 weight parts based on 100 weight parts of all of the binders constituting the transparent hard coat layer 30.

The large-diameter matting agent produces unique wave-like protrusions and recesses on the surface of the ionizing radiation curable resin film (hard coat layer) when combined with the aforementioned ionizing radiation curable resin binder, and thereby imparts an excellent anti-Newton ring property while reducing the content of the matting agent and maintains a high transparency.

The thickness of the transparent hard coat layer 30 is preferably 2–15 μm, more preferably 3–8 μm.

The easy adhesion layer 40 formed on the transparent hard coat layer 30 has the same function as that of the easy adhesion layer 3 of the easy adhesion film for a transparent conductive thin film according to the first aspect. Specifically, it improves durability of the transparent conductive thin film 60 because of its excellent adhesion property to the transparent conductive thin film 60 such as an ITO, and, when the transparent conductive film sheet 70 obtained by forming the transparent conductive thin film 60 is used in a touch panel of a color liquid crystal display, also prevents generation of glare of the color screen. Therefore, it can provide a transparent conductive film sheet 70 suitable for use in both touch panels of monochrome and color liquid crystal displays.

The easy adhesion layer 40 can be obtained by applying a composition including the ionizing radiation curable resin and the thermoplastic resin, as main binder ingredients, and a matting agent having an average diameter of 5–50 nm (hereinafter referred to as "small-diameter matting agent"), and then exposing to ionizing radiation (UV or electron beam) to cross-link and cure the coating.

The same binders (ionizing radiation curable resin, thermoplastic resin, thermosetting resin and the like) as those of the easy adhesion layer 3 according to the first aspect can be used for the binders constituting the easy adhesion layer 40.

The content of the ionizing radiation curable resin is preferably 70–97 weight % of all of binders constituting the easy adhesion layer 40. When the content is not more than 97 weight %, adhesion of the easy adhesion layer 40 and the transparent conductive thin film 60 is maintained. When the content is not less than 70 weight %, anti-abrasion property of the easy adhesion layer 40 is kept within a practical range and durability of the easy adhesion layer 40 provided with the transparent conductive thin film 60 is not degraded.

The thermoplastic resin binder plays a role of improving adhesion of the easy adhesion layer 40 to the transparent conductive thin film 60. The content of the thermoplastic resin binder is preferably 3–30 weight % of all of the binder ingredients constituting the easy adhesion layer 40. When the content is not less than 3 weight %, adhesion of the easy adhesion layer 40 to the transparent conductive thin film 60 becomes good and when the content is not more than 30 weight %, anti-abrasion property of the easy adhesion layer 30 is not impaired.

The small-diameter matting agent plays a role of producing very fine protrusions and recesses on the surface of the transparent hard coat layer 30 having relatively rough protrusions and recesses formed by the large- diameter matting agent. The same material as those of the large-diameter matting agent can be used for the small-diameter matting agent but they may be the same or different ones. The average particle diameter is preferably 5–50 nm, more preferably 10–30 nm. The mixing ratio of the small-diameter matting agent is 1–8 weight parts, more preferably 2–6 weight parts based on 100 weight parts of all of the binders constituting the easy adhesion layer 40.

Such a small-diameter matting agent produces very fine protrusions and recesses on the surface of the transparent hard coat layer 30 having relatively rough protrusions and recesses formed by the large- diameter matting agent. By this, when the transparent conductive film sheet 70 obtained by forming a transparent conductive layer 60 on the easy adhesion layer 40 is used in a touch panel of a color liquid crystal display, glare on the color screen can be prevented.

The thickness of the easy adhesion layer 40 is preferably 0.2–1.5 μm, more preferably 0.5–1.0 μm.

The transparent hard coat layer 30 and the easy adhesion layer 40 can be cross-linked and cured using the same kind of UV or electronic beam used for the easy adhesion layer 3 of the easy adhesion film for a transparent conductive thin film 1 shown in FIG. 1(*a*). In this case also, it is preferable to perform irradiation under an inert gas such as $N_2$ gas in order to prevent curing inhibition by oxygen in air.

In cross-linking and curing the transparent hard coat layer 30, curing may not be completed (full-cured) but performed with a low energy to obtain pre-cured (semi-cured) layer, which is further cured using a high energy at the time when the easy adhesion layer 40 is cross-linked and cured after laminated on the transparent hard coat layer 30. By this method, adhesion between the transparent hard coat layer 30 and the easy adhesion layer 40 can be improved.

EXAMPLES

Working examples of the present invention will be now described. In the examples, "part" and "%" are based on weight unless otherwise defined.

Example 1

A coating solution (a) for an easy adhesion layer having the composition shown in Table 1 was applied on one surface of a polyethylene terephthalate film having a thickness of 188 μm (COSMOSHINE A4300: Toyobo Co., Ltd.), heated and dried at 60° C. for 5 minutes, and then exposed to UV from a high-pressure mercury-vapor lamp for 1–2 seconds to form an easy adhesion film having a thickness of about 5 μm.

Comparative Examples 1–4

Easy adhesion film for a transparent conductive thin film were prepared in the same manner as in Example 1 except that coating solutions (b)–(e) were used instead of the coating solution (a) of Example 1.

Binder A in Table 1 is an ionizing radiation curable resin (Diabeam UR6530: Mitsubishi Rayon Co., Ltd.), and Binder B is a thermoplastic acetal resin (Ethelec BL-S: Sekisui Chemical Co., Ltd.). Matting agent C is porous silica (SYLYSIA 446, average diameter 4.5 μm: Fuji Silysia Chemical Co., Ltd.), and Matting agent D is fine powder silica (Aerosil 50, average diameter 30 nm: Nippon Aerosil Co., Ltd.). Additive E is a photopolymerization initiator (IRGACURE 651: Ciba Specialty Chemicals).

TABLE 1

| material | Coating solution for hard coat layer (parts) | Coating solution for easy adhesion layer (parts) | | | | |
|---|---|---|---|---|---|---|
| | | a | b | c | d | e |
| Binder A | 30.0 | 27.0 | 30.0 | — | 27.0 | 27.0 |
| Binder B | — | 3.0 | — | 30.0 | 3.0 | 3.0 |
| Micro-particle C | — | 1.5 | 1.5 | 1.5 | 1.5 | — |
| Micro-particle D | — | 1.5 | 1.5 | 1.5 | — | 1.5 |
| AdditiveE | 0.15 | 0.15 | 0.15 | — | 0.15 | 0.15 |
| MEK | 40.0 | 40.0 | 40.0 | 40.0 | 40.0 | 40.0 |
| Toluene | 30.0 | 30.0 | 30.0 | 30.0 | 30.0 | 30.0 |

Transparent conductive thin films 6 as shown in FIG. 2 were produced using the thus obtained easy adhesion films for a transparent conductive thin film of Example 1 or Comparative Examples 1–4. Transparency was evaluated after a hard coat film 4 (FIG. 1) having a thickness of about 5 μm was formed on each of the easy adhesion films for a transparent conductive thin film by applying a coating solution for a hard coat film having the composition shown in Table 1 to the opposite surface to the easy adhesion layer, drying and then exposing to UV from a high-pressure mercury-vapor lamp for 1–2 seconds. Then an ITO film, i.e., a transparent conductive thin film, having a thickness of about 25 nm was formed on the easy adhesion layer 3 by sputtering, and adhesion property of the easy adhesion layer 3 to the transparent conductive thin film 5 was evaluated. The evaluation of transparency and adhesion were conducted as follows. The evaluation results are shown in Table 2.

[Transparency]

Transparency was evaluated by the haze value (%) (JIS-K7105) measured by using an SM color computer HGM-2K (Suga Test Instruments).

[Adhesion Property]

Adhesion property was evaluated using a cross cut tape test (JIS-K5400). In Table 2, "○" indicates that the transparent conductive thin film was not peeled from the easy adhesion layer and "X" indicates that the transparent conductive thin film was peeled from the easy adhesion layer.

Next, an ITO film having a thickness of about 30 nm was formed on a glass substrate having a thickness of 1.1 mm by sputtering to form a lower electrode base and dot-spacers having a height of 5 μm and a diameter of 50 μm were formed on the lower electrode base at intervals of 1.0 mm to form a glass plate with a transparent conductive thin film.

A touch panel having the structure shown in FIG. 2 was produced using each of the easy adhesion films for a transparent conductive thin film of Example 1 and Comparative Examples 1–4 and the aforementioned lower electrode base 7 provided with the dot-spacers 8 (FIG. 2 shows only part of the structure of the touch panel, and the peripheral insulation and output circuit are not shown in the figure). Anti-Newton ring property of the thus obtained touch panels and durability of the transparent conductive thin films 5 were evaluated. The evaluation results are also shown in Table 2.

[Anti-Newton Ring Property]

A rating of "○" was given if the Newton ring did not generate between the transparent conductive film sheet 6 and the lower electrode base 7 when the transparent conductive film sheet 6 was pressed toward the lower electrode base 7. A rating of "Δ" was given if a Newton ring generated. A rating of "X" was given if a Newton ring generated and release characteristic of the transparent conductive film sheet 6 from the lower electrode base 7 was bad.

[Durability]

The transparent conductive thin film 5 was observed after dotting durability test was performed using a dotting tip of rubber material having a Shore hardness of 60 under the conditions of load 300 g, dotting cycle 10,000 times/hour and dotting times 100,000. A rating of "○" was given if no remarkable abnormality was observed in the transparent conductive thin film 5, and a rating of "X" was given if the transparent conductive thin film 5 was abraded.

Next, the thus obtained touch panels using the transparent conductive film sheets produced from the easy adhesion films for a transparent conductive thin film of Example 1 and Comparative Examples 1–4 were respectively placed on a color liquid display (T55A-9513:IBM) and generation of glare of the color display was evaluated visually as follows. The evaluation results are also shown in Table 2. It was represented by "Screen glare" in Table 2.

[Generation of Glare of Color Screen]

If the color screen did not produce glare, "○" was given. If RGB light emitting points was enlarged and the screen produced glare, "X" was given.

TABLE 2

| | Example 1 | Comp. Exam. 1 | Comp. Exam. 2 | Comp. Exam. 3 | Comp. Exam. 4 |
|---|---|---|---|---|---|
| Transparency (haze) | 7.1 | 6.9 | 9.5 | 5.3 | 1.7 |
| Adhesion | ○ | X | ○ | ○ | ○ |
| Anti-Newton ring property | ○ | ○ | Δ | ○ | X |
| Durability | ○ | X | X | ○ | ○ |
| Screen glare | ○ | ○ | ○ | X | ○ |

As clear from the results shown in Table 2, good results in transparency, adhesion property, anti-Newton ring property, durability and generation of glare of the color screen were achieved for the easy adhesion film for a transparent conductive thin film of Example 1.

On the other hand, regarding the easy adhesion film for a transparent conductive thin film of Comparative Example 1, since the easy adhesion layer contained no thermoplastic resin binder, adhesion to the transparent conductive thin film was bad and therefore durability of the transparent conductive thin film was poor.

Regarding the easy adhesion film for a transparent conductive thin film of Comparative Example 2, anti-Newton ring property was no sufficient because the easy adhesion layer contained no ionizing radiation curable resin binder and therefore it could not effect anti-Newton ring property, which would be caused by unique wave-like protrusions and recesses formed on the surface of an ionizing radiation curable resin film including particulate materials. Further, good durability of the transparent conductive thin film could not be achieved since anti-abrasion property of the easy adhesion layer was poor.

Regarding the easy adhesion film for a transparent conductive thin film of Comparative Example 3, since only large-diameter matting agent was included in the easy adhesion layer, glare of the screen caused by RGB light emitting points were not suppressed.

Regarding the easy adhesion film for a transparent conductive thin film of Comparative Example 4, surface roughness required for obtaining anti-Newton ring property could not be produced because only small-diameter matting agent was included in the easy adhesion layer.

Example 2

A coating solution (f) for a transparent hard coat layer having the following composition was applied on one surface of a polyethylene terephthalate film having a thickness of 188 μm (COSMOSHINE A4300: Toyobo Co., Ltd.), heated and dried at 60° C. for 5 minutes, and then exposed to UV from a high-pressure mercury-vapor lamp for 1–2 seconds to form a transparent hard coat layer having a thickness of about 5 μm. Then, a coating solution (g) for an easy adhesion layer having the following composition was applied on the transparent hard coat layer, heated and dried at 60° C. for 5 minutes, and then exposed to UV from a high-pressure mercury-vapor lamp under an inert gas for 2 seconds to form an easy adhesion film for a transparent conductive thin film having a thickness of about 1 μm. Thus, an easy adhesion film for a transparent conductive thin film having a structure shown in FIG. 1(b) was produced.

<coating solution for a transparent hard coat layer (f)>

| | |
|---|---|
| * Ionizing radiation curable resin (Diabeam UR6530: Mitsubishi Rayon) | 30.0 parts |
| * Matting agent (Forous silica (SYLYSIA 446, average diameter 4.5 μm: Fuji Silysia Chemical)) | 1.5 parts |
| * Photopolymerization initiator (IRGACURE 651: Ciba Specialty Chemicals) | 0.15 parts |
| * Methylethylketon | 40.0 parts |
| * Toluene | 30.0 parts |

<Coating solution for an easy adhesion layer (g)>

| | |
|---|---|
| * Ionizing radiation curable resin (Diabeam UR6530: Mitsubishi Rayon) | 27.0 parts |
| * Thermoplastic acetal resin (Ethlec BL-S: Sekisui Chemical) | 3.0 parts |
| * Matting agent (Micro-powder silica (Aerosil 50, ayerage diameter 30 nm: Nippon Aerosil)) | 1.5 parts |
| * Photopolymerization initiator (IRGACURE 651: Ciba Specialty Chemicals) | 0.15 parts |
| * Methylethylketon | 40.0 parts |
| * Toluene | 30.0 parts |

Comparative Example 5

The easy adhesion film for a transparent conductive thin film of Comparative Example 5 was prepared in the same manner as in Example 2, except that no easy adhesion layer for a transparent conductive thin film was formed and only the transparent hard coat layer was formed under the condition of cross-linking and curing by exposure to UV from a high-pressure mercury-vapor lamp for 2 seconds.

Comparative Example 6

The easy adhesion film for a transparent conductive thin film of Comparative Example 6 was prepared in the same manner as in Example 2, except that no transparent hard coat layer was formed and the easy adhesion layer for a transparent conductive thin film was formed directly on the polyethylene terephthalate film.

For the thus obtained easy adhesion films for a transparent conductive thin film of Example 2 and Comparative Examples 5 and 6, transparency was evaluated after a hard coat film 4 having a thickness of about 5 μm was formed on each of the easy adhesion films for a transparent conductive thin film by applying a coating solution for a hard coat film having the following composition (h) to the opposite surface to the easy adhesion layer or transparent hard coat layer, drying and heating at 60° C. for 5 minutes, and then exposing to UV from a high-pressure mercury-vapor lamp for 1–2 seconds.

Then, an ITO film, i.e., a transparent conductive thin film, having a thickness of about 25 nm was formed on the easy adhesion layer by sputtering and adhesion of the easy adhesion layer against the transparent conductive thin film was evaluated. The transparency and adhesiveness were evaluated in the same manner as in Example 1. The evaluation results are shown in Table 3.

<coating solution for a transparent hard coat layer (h)>

| | |
|---|---|
| * Ionizing radiation curable resin (Diabeam UR6530: Mitsubishi Rayon) | 30.0 parts |
| * Photopolymerization initiator (IRGACURE 651: Ciba specialty Chemicals) | 0.15 parts |
| * Methylethylketon | 40.0 parts |
| * Toluene | 30.0 parts |

Next, an ITO film having a thickness of about 30 nm was formed on a glass substrate having a thickness of 1.1 mm by sputtering to form a lower electrode base and dot-spacers having a height of 5 μm and a diameter of 50 μm were formed on the lower electrode base at intervals of 1.0 mm to form a glass plate with a transparent conductive thin film.

A touch panel having the structure shown in FIG. 3 was produced using each of the easy adhesion films for a transparent conductive thin film of Example 2 and Comparative Examples 5, 6 and the aforementioned lower electrode base provided with the dot-spacers (FIG. 3 shows only part of the structure of the touch panel, and the peripheral insulation and output circuit are not shown in the figure). Anti-Newton ring property of the thus obtained touch panels and durability of the transparent conductive thin films 5 were evaluated. The evaluation results are shown in Table 3.

In evaluation of the anti-Newton ring property, a rating of "○" was given if a Newton ring was not produced between the transparent conductive film sheet and the lower electrode base when the transparent conductive film sheet was pressed toward the lower electrode base. A rating of "X" was given if a Newton ring was produced. Durability was evaluated in the exactly same manner as for the touch panels produced using the easy adhesion films for a transparent conductive layer of Example 1 and Comparative Examples 1–4.

Next, the thus obtained touch panels using each of transparent conductive film sheets produced from the easy adhesion film for a transparent conductive thin film of Example 2 and Comparative Examples 5, 6 were placed on a color liquid display (T55A-9513:IBM) and generation of glare of the color display was evaluated. The evaluation was performed in the exactly same manner as for the touch panels produced using the easy adhesion films for a transparent conductive layer of Example 1 and Comparative Examples 1–4. The results are also shown in Table 3.

TABLE 3

|  | Example 2 | Comp. Exam. 5 | Comp. Exam. 6 |
|---|---|---|---|
| Transparency (haze) | 6.0 | 6.4 | 1.3 |
| Adhesion | ○ | X | ○ |
| Anti-Newton ring property | ○ | ○ | X |
| Durability | ○ | X | X |
| Screen glare | ○ | X | ○ |

As clear from the results shown in Table 3, good results in all of transparency, adhesion property, anti-Newton ring property, durability and generation of glare of the color screen were achieved for the easy adhesion film for a transparent conductive thin film of Example 2.

On the other hand, regarding the easy adhesion film for a transparent conductive thin film of Comparative Example 5, since no easy adhesion layer including a thermoplastic binder was formed on the transparent hard coat layer, adhesion to the transparent conductive thin film was bad and, therefore, the durability of the transparent conductive thin film was poor. Further, glare of the screen caused by RGB light emitting points was not suppressed.

In the easy adhesion film for a transparent conductive thin film of Comparative Example 6, anti-Newton ring property could not be achieved and durability of the transparent conductive thin film was poor since no transparent hard coat layer was formed and only the easy adhesion layer was formed.

What is claimed is:

1. A support film providing good adhesiveness to a transparent conductive thin film comprising:

a transparent polymer film; and an adhesive layer formed on the transparent polymer film, said adhesive layer comprising an ionizing radiation curable resin binder, a thermoplastic resin binder and at least two matting agents having first and second average diameters.

2. The support film providing good adhesiveness to a transparent conductive thin film of claim 1, wherein the matting agents include a first matting agent having an average diameter of 1–15 μm and a second matting agent having an average diameter of 5–50 nm.

3. A support film providing good adhesiveness to a transparent conductive thin film comprising:

a transparent polymer film;

a transparent hard coat layer formed on the transparent polymer film and comprising an ionizing radiation curable resin binder and a matting agent having an average diameter of 1–15 μm; and an adhesive layer formed on said transparent hard coat layer and comprising an ionizing radiation curable resin binder, a thermoplastic resin binder and a matting agent having an average diameter of 5–50 nm.

4. The support film of claim 3, wherein the thickness of the transparent hard coat layer is 2–15 μm and the thickness of the adhesive layer is 0.2–1.5 μm.

5. A transparent conductive film sheet comprising a support film of claim 1 and a transparent conductive thin film formed on the support film.

6. A transparent conductive film sheet comprising a support film of claim 2 and a transparent conductive thin film formed on the support film.

7. A transparent conductive film sheet comprising a support film of claim 3 and a transparent conductive thin film formed on the support film.

8. A transparent conductive film sheet comprising a support film of claim 4 and a transparent conductive thin film formed on the support film.

* * * * *